United States Patent [19]
Weidman et al.

[11] Patent Number: 5,560,284
[45] Date of Patent: Oct. 1, 1996

[54] AUTOMATIC DRIP BREWING URN

[75] Inventors: Craig C. Weidman, Wooster; John E. Bertrand, Fairview Park, both of Ohio; Joseph F. Moore, Richmond, Va.; Daniel J. Wanhainen, Newbury, Ohio

[73] Assignee: Ohio Mattress Licensing and Components Group, Cleveland, Ohio

[21] Appl. No.: 340,057

[22] Filed: Jan. 11, 1995

Related U.S. Application Data

[63] Continuation-in-part of Ser. No. 31,007, Nov. 15, 1994, Pat. No. Des. 369,057.

[51] Int. Cl.⁶ .................................................. A47J 31/00
[52] U.S. Cl. .................................................. 99/281; 99/307
[58] Field of Search ........................... 99/279–283, 307, 99/285, 298, 295, 323, 284; 426/433

[56] References Cited

U.S. PATENT DOCUMENTS

| | | |
|---|---|---|
| 3,693,535 | 9/1972 | Abel, Jr. |
| 4,191,100 | 3/1980 | Marotta |
| 4,309,939 | 1/1982 | Stover |
| 4,354,427 | 10/1982 | Filipowicz et al. |
| 4,402,257 | 9/1983 | Marotta |
| 4,503,757 | 3/1985 | Dougherty |
| 4,513,745 | 9/1986 | Marotta et al. |
| 4,667,587 | 5/1987 | Wunder |
| 4,779,520 | 10/1988 | Hauslein |
| 4,825,759 | 5/1989 | Grome et al. |
| 4,867,048 | 9/1989 | Brewer |
| 5,064,533 | 11/1991 | Anson |
| 5,133,247 | 7/1992 | Pastrick |
| 5,150,803 | 9/1992 | Cartellone |
| 5,183,998 | 2/1993 | Hoffman et al. |
| 5,231,918 | 8/1993 | Grzywna |

OTHER PUBLICATIONS

Newco Low Profile Dual Brew Automatic Coffee Brewer Spec. Sheet (No Date).
Newco Model KP-P Specification Sheet (No Date).
Bloomfield Brewing Equipment Specification Sheet (Jan. 1990).
Bloomfield Integrity Model 8702 Specification Sheet (No Date).
Bloomfield Lo Profile Model 8572 Specification Sheet (No Date).
Bunn Pour–Omatic Model S Brewer Specification Sheet (No Date).
Bunn Pour–Omatic Model VPS–F Brewer Specification Sheet (No Date).

*Primary Examiner*—Robert W. Jenkins
*Attorney, Agent, or Firm*—Calfee Halter & Griswold

[57] ABSTRACT

An automatic drip beverage brewing apparatus in the form an urn includes a liquid reservoir, a brewed beverage reservoir, a brewing basket for holding coffee or tea over an opening to the beverage reservoir, a spigot in the brewed beverage reservoir for draining brewed beverage from the brewed beverage reservoir, and a cover which covers both the liquid reservoir and the brewed beverage reservoir. The brewed beverage reservoir includes a liner which provides an insulative air gap between the liner and the housing which defines the brewed beverage reservoir. A warming element is attached to the brewed beverage reservoir liner. A swing arm shower head is positionable over an opening to the brewing basket. A conduit provides a liquid passageway from the liquid reservoir to a liquid heating element to the shower head. The liquid and beverage reservoirs may be integrally formed by a common housing mountable upon a base which houses the heating element. A hinge mounted lid covers the open tops of the liquid and beverage reservoirs.

22 Claims, 10 Drawing Sheets

5,560,284

AUTOMATIC DRIP BREWING URN

RELATED APPLICATIONS

This application is a continuation-in-part of U.S. application Ser. No. 29/031,007, filed Nov. 15, 1994 now U.S. Pat. No. Des. 369,057.

FIELD OF THE INVENTION

The present invention relates generally to automatic drip brewing apparatus for brewing coffee or tea or the like and, more particularly, to automatic drip brewing apparatus in the form of an urn.

BACKGROUND OF THE INVENTION

Automatic drip brewing devices prepare coffee or tea by controlled delivery of heated water from a water reservoir through a porous filter holding coffee or tea in a filter basket which drains into a separate receptacle such as a carafe or pitcher which is not connected to the device. The brewed beverage is then poured from the pitcher. A warming element in a base on which the pitcher rests transfers some heat to the brewed beverage. However, pitchers constructed of glass or metal are not well insulated and therefore the warming element is not sufficient to keep the brewed beverage hot.

Automatic drip brewing devices intended primarily for home use are dimensioned to produce and hold relatively small quantities of brewed beverage in a pitcher or carafe, such as a total of eight to ten cups produced in a single brewing cycle. The relatively small size of the pitchers of such devices allows for lifting and pouring. This arrangement is therefore not suitable for preparing larger quantities, such as more than ten cups, of brewed beverage in a single brewing cycle for the reasons that a pitcher receptacle of sufficient volume becomes difficult to handle and adequately insulate.

Commercial automatic drip brewing devices, such as for example the Bunn Model No. CWTF-20, use a relatively large capacity (e.g., 20 cups) free-standing metal brewed beverage receptacle fitted with a spigot for dispensing the beverage from the receptacle. The metal receptacle, however, is generally not well insulated nor partially surrounded by a water reservoir. Also, the metal receptacle must have an opening in the top through which the brewed beverage enters by dripping. Heat is lost through this opening.

SUMMARY OF THE PRESENT INVENTION

The present invention overcomes these and other disadvantages of the prior art by providing an automatic drip brewing apparatus in the form of an urn from which brewed beverage can be dispensed through a spigot connected to a brewed beverage reservoir which is integrally attached to and partially surrounded by the liquid reservoir. A single cover covers top openings of the liquid reservoir and the brewed beverage reservoir. A brewing basket is positioned within the brewed beverage reservoir to provide a thermal barrier so that the heat of water introduced into the brewing basket is retained in the brewed beverage reservoir. The integrally constructed liquid reservoir and brewed beverage reservoir can be dimensioned to produce a relatively large amount of brewed beverage in a single brewing cycle. The brewed beverage reservoir includes an insulative liner spaced from walls of a housing to provide an insulative air gap. A spigot in the brewed beverage reservoir allows the beverage to be dispensed without significant loss of heat from the brewed beverage reservoir.

In accordance with certain aspects of the invention, a brewing apparatus for preparing, holding, warming and dispensing brewed beverage includes a liquid reservoir for receiving and holding a liquid used to prepare the brewed beverage, a heat source in thermal communication with liquid from the liquid reservoir, an insulated and heated beverage reservoir adjacent the liquid reservoir for receiving, holding and warming the brewed beverage, a brewing basket positioned to drain into the brewed beverage reservoir and adapted to hold a filter and a flavor-carrying material in the filter, a heated liquid passageway from the liquid reservoir to the brewing basket, and a brewed beverage passageway through a wall of the brewed beverage reservoir.

These and other aspects of the invention are herein described in detail with reference to the annexed drawings wherein like reference numerals refer to like parts.

DETAILED DESCRIPTION OF A PREFERRED EMBODIMENT

Figure 1:
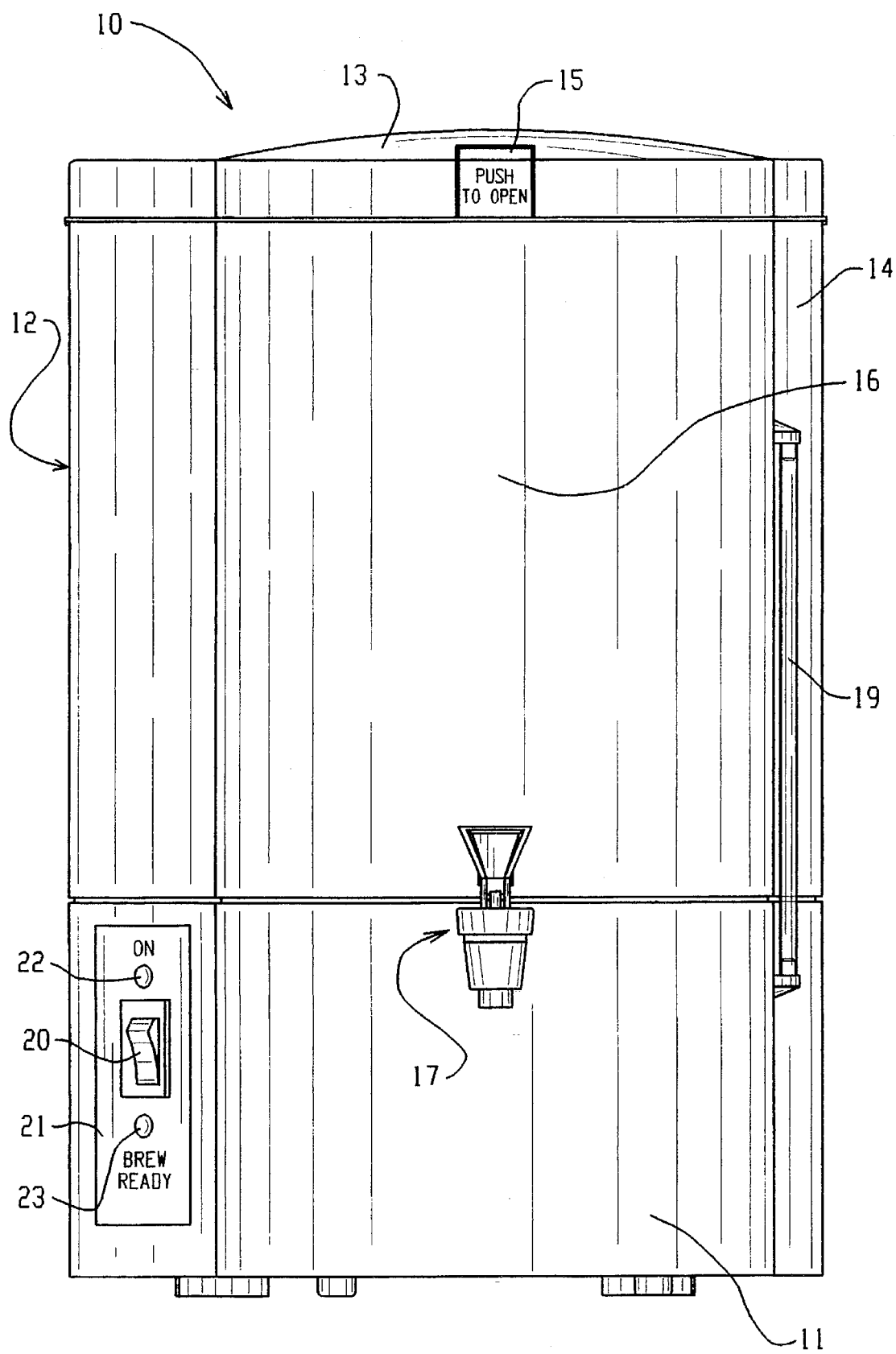
FIG. 1 is front elevational view of the brewing apparatus of the present invention.
Figure 2:
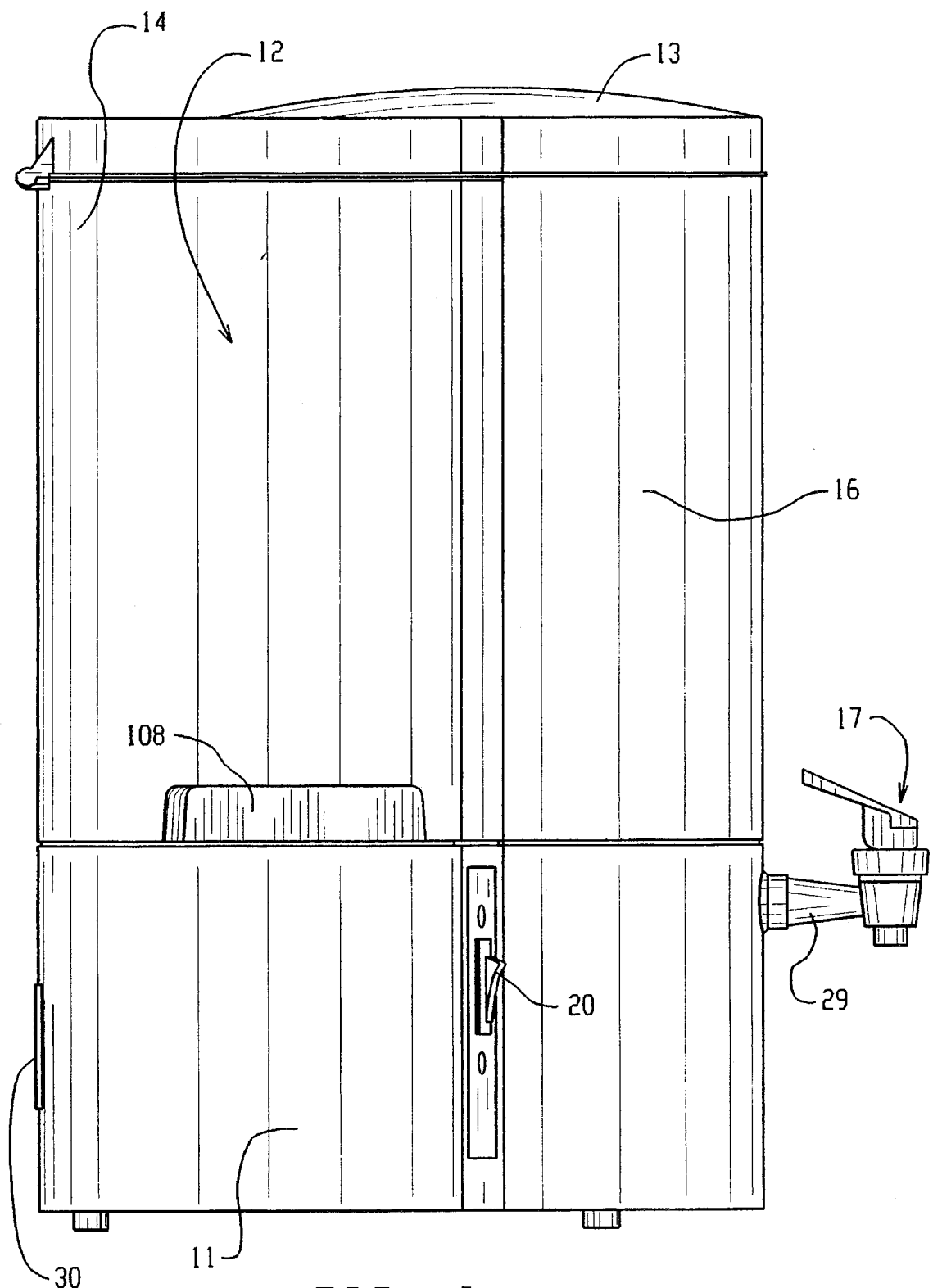
FIG. 2 is a side elevation of the brewing apparatus of the present invention.

FIGS. 1 through 4 illustrate a large capacity automatic drip brewing apparatus 10 in the form of an urn having a base 11 upon which is fitted a housing 12 which includes a liquid reservoir 14 integrally formed with or adjoined adjacent a brewed beverage reservoir 16o The top of the housing 12 is covered by a hinge mounted cover 13 having a manually operable latch 15. A lever operated faucet 17 has a pipe portion 29 mounted horizontally in an opening in base 11 to provide a liquid passageway to a bottom area of brewed beverage reservoir 16. Faucet 17 may be, for example, a Tomlinson model #1008257 manufactured by Tomlinson Industries. Similar dispensing or valve arrangements may be employed. A brewed beverage level indicator 19, in the form a transparent tube which may be provided with volume indicating markings thereon, is mounted externally of housing 12 and base 11 and connected at its lower end to a fluid passageway to the brewed beverage reservoir. A power control switch 20 supported by an escutcheon plate 21 mounted in a side portion of the base along with "on" and "brew ready" indicator lamps 22 and 23. Lifting handles 108 are formed as elongate indentations in the bottom edges of the housing side walls above base 11 to allow the entire brewing apparatus to be gripped for lifting. A power cord storage cavity 30 is provided in base 11.

The capacity of the liquid reservoir 14 can be of any desired size and may be relatively large, such as on the order of approximately 200 ounces or larger, an amount sufficient to produce as much as twenty-four eight ounce cups of a brewed beverage in a single brewing cycle. The capacity of the brewed beverage reservoir 16 can be made larger than that of the liquid reservoir 14 in order to receive all of the liquid from the liquid reservoir and to house a brewing basket 18 which is suspended through a top opening of the brewed beverage reservoir 16.

Housing 12 includes an exterior perimeter wall 24 which encompasses the liquid reservoir 14 and the brewed beverage reservoir 16. An interior wall 25 of housing 12 defines the generally cylindrical brewed beverage reservoir housing 16 dimensioned to receive an insulative liner 28. Side walls 34 of liner 28 are inwardly tapered toward bottom wall 36 to form an insulative air gap 35 which surrounds liner 28, resulting in superior insulative characteristics particularly advantageous for relatively large quantities of brewed beverage to be kept warm within the liner. Liner 28 is supported by stilts 36a attached to an upper portion of base 11. Liner 28 may be constructed of any suitable material or combination of materials such as heat resistant plastics and/or metals which do not impart a taste to the brewed beverage. An overflow port 31 may be formed in perimeter wall 24 into the liquid reservoir 14.

Brewing basket 18, dimensioned to receive a standard size filter such as an A8 automatic drip coffee filter, has a top opening 38 and a radial flange 39 which rests upon a top edge of liner 28 to position and support the basket in an upper region of the liner. The brewing basket includes tapered side walls 27 and a drain hole 40 through which liquid introduced into the basket from a liquid distributor 50 drains (through coffee or tea or the like held in a filter) into liner 28. A handle 37 (shown in FIG. 4 only) may be provided to extend from flange 39 and overhang interior wall 25. A radially opposed gripping tab 33, extending upwardly from flange 39, may also be provided to facilitate removal of the basket from the brewed beverage reservoir. The brewing basket 18 may further include a moisture barrier 32 attached to a bottom exterior portion of the basket about drain hole 40. The peripheral edge of the moisture barrier 32 is dimensioned to fit within liner 28 to provide an evaporation barrier and thereby retain heat and flavor in the brewed beverage below. The barrier 32 is preferably made of a flexible material which does not impede removal or insertion of the brewing basket in liner 28.

Figure 3:
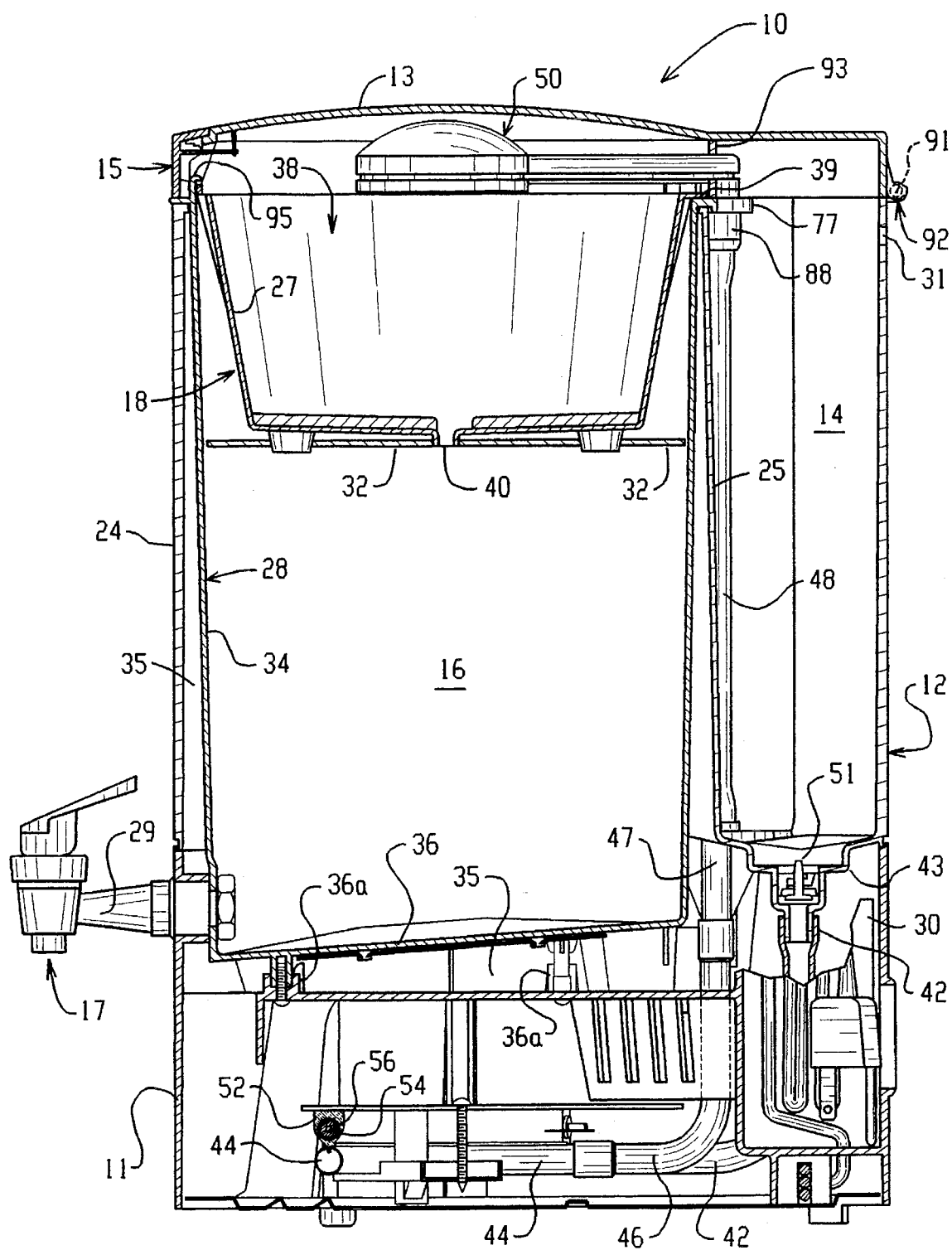
FIG. 3 is a cross-section of a side elevation of the brewing apparatus of the present invention.
Figure 4:
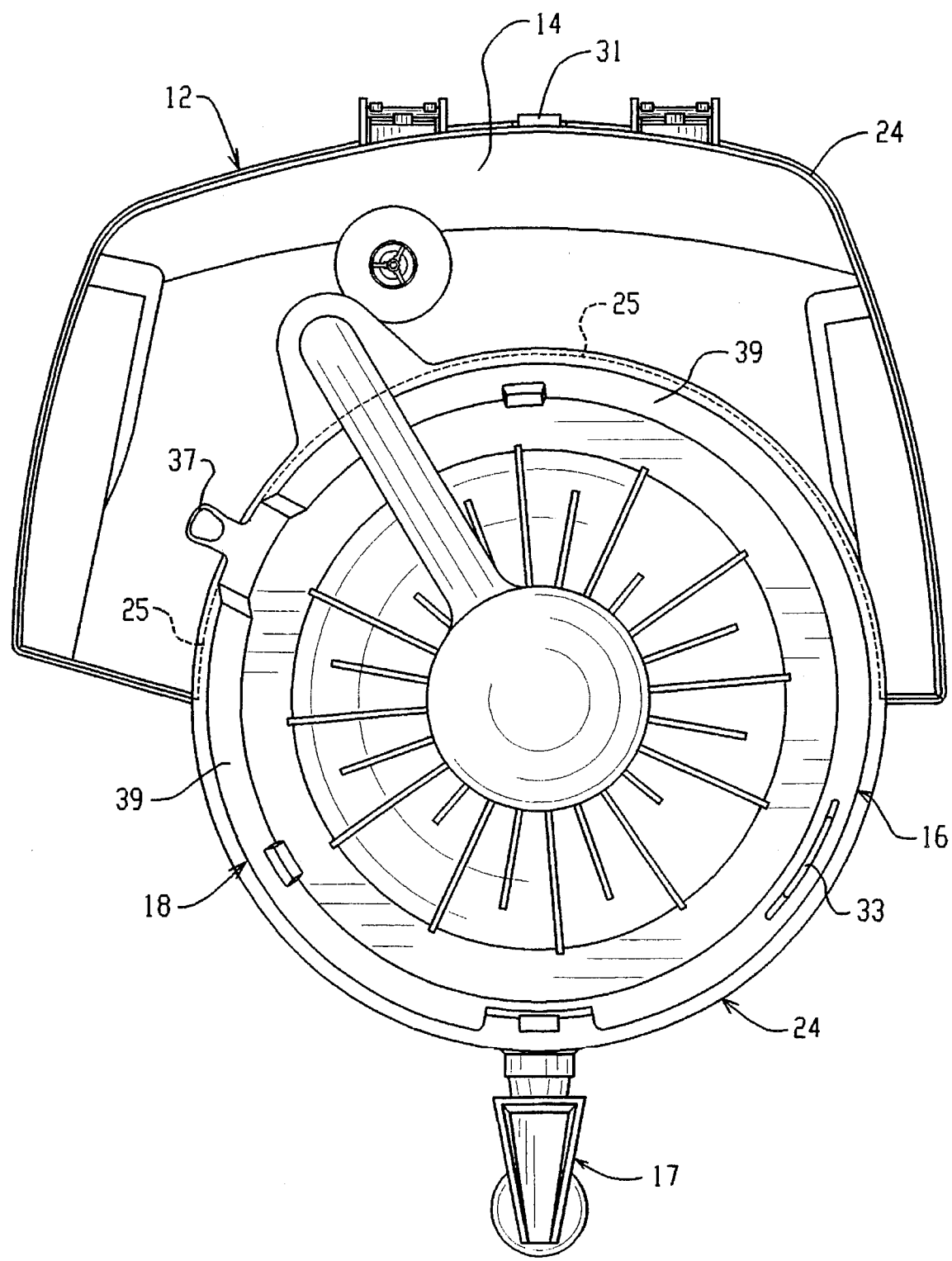
FIG. 4 is a top view of the brewing apparatus of the present invention with the cover removed.

Referring now solely to FIG. 3, a liquid supply tube 42 provides a liquid flow passage from a bottom end 43 of liquid reservoir 14 to one end of a heated pipe section 44 connected at an opposite end to a heated liquid transfer tube 46. An upper end of heated liquid transfer tube 46 is connected to a through-fitting 47 in the bottom of liquid reservoir 14. A vertically positioned second heated liquid supply tube 48 is connected at a lower end to through-fitting 47 inside of liquid reservoir 14 and at an upper end to a heated liquid distributor 50. Liquid distributor 50 is pivotally positionable over top opening 38 of brewing basket 18 as described further below.

Liquid supply tube 42 is connected to liquid reservoir 14 through a pressure-controlled unidirectional plunger-type valve 51 which allows liquid to drain by gravity from the liquid reservoir, and prevents liquid from flowing into the liquid reservoir by closing in response to pressure directed toward the liquid reservoir.

Heated pipe section 44 is provided to heat liquid received from the liquid reservoir to a temperature suitable for brewing beverage by an automatic drip process, and pumping heated liquid by vapor pressure upward through heated liquid supply tubes 46 and 48 to liquid distributor 50. The heated pipe section 44 is constructed substantially in accordance with known devices for creating a flow of heated water from a liquid reservoir to a liquid distributor in a hot beverage maker device, such as described for example in U.S. Pat. Nos. 4,613,745 and 5,183,998 which are incorporated herein by reference.

As shown in cross-section in the bottom portion of FIG. 3, heated pipe section 44 is formed or extruded integrally with and/or connected to a resistive element housing 52 which houses a resistive element 54, such as a resistance coil, surrounded by an electrically insulating thermally conductive material 56 such as magnesium oxide. By this construction, resistive element 54 is in thermal communication with heated pipe section 44 when current is applied to resistive element 54. Resistive element housing 52, including heated pipe section 44, is preferably formed of a common thermally conductive material, such as extruded aluminum, to optimize heat transfer from resistive element 54 to heated pipe section 44.

Figure 5A:
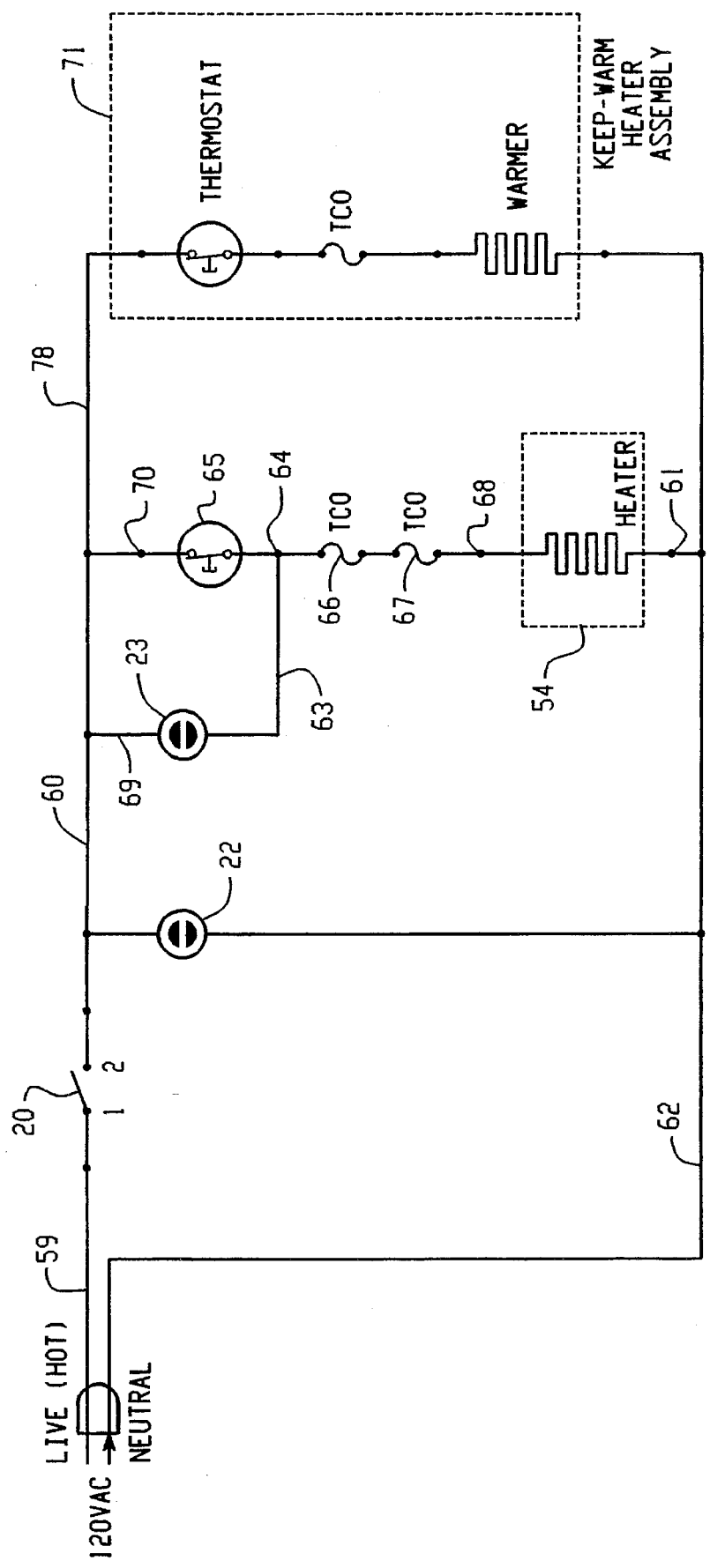
FIGS. 5A and 5B are schematic diagrams of the electrical power and control system of the brewing apparatus of the present invention.

As schematically illustrated in FIG. 5A, electrical line 59 connects a power source (such as an AC 120 V 60 Hz plug not shown) to terminal 1 of switch 20. Line 60 connects terminal 2 of switch 20 to "POWER ON" indicator light 22 (shown in FIG. 1), and terminal 70 of thermostat 65. A neutral line 62 is connected to terminal 61 of resistive element 54 and to a terminal of a keep warm heating element 71 described below. Line 63 connects "BREW READY" indicator light 23 to a terminal 64 of thermostat 65. Thermostat 65 is in direct thermal contact with exterior surfaces of heated pipe section 44 and resistive element housing 52. Thermostat terminal 64 is connected to a thermal limiting heat fuse bridge including connected heat fuses 66 and 67. Heat fuse 67 is connected to a terminal 68 of resistive element 54. Terminal 70 of thermostat 65 is connected to another lead of the keep warm element 71 (which may include its own thermostat and heat fuse) by line 78. By this arrangement, the maximum temperature reachable by resistive element 54 is limited by the settings of thermostat 65 and heat fuses 66 and 67. Line 69 connects terminal 70 of thermostat 65 to "BREW READY" indicator light 23. The "BREW READY" indicator light 23 is therefore illuminated when thermostat 65 opens.

Figure 5B:
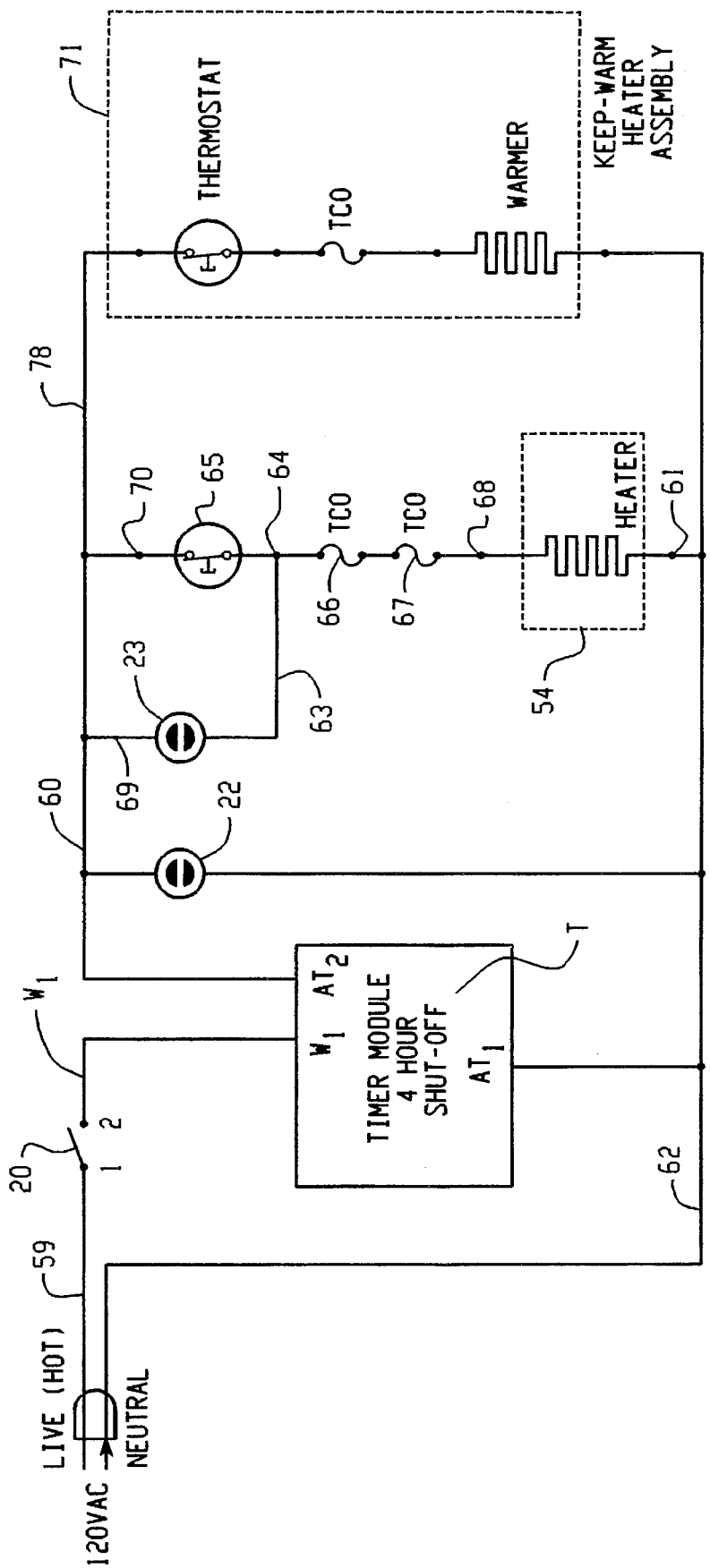

In an alternate embodiment illustrated in FIG. 5B, an automatic timer module T, for example in the form of a module such as described in detail in U.S. Pat. No. 5,183,998, incorporated herein by reference, can be included in the above described power circuit by connection of timer module terminal $AT_1$ to neutral line 62 which is again connected to "POWER ON" indicator light 22, resistive element 54 (at terminal 61), and keep warm element 71. Terminal $W_1$ of the timer module is connected to terminal 2 of power switch 20, and terminal $AT_2$ of the timer module is connected by line 60 to "POWER ON" indicator light 22, and terminal 70 of thermostat 65, and with similar connections to the "BREW READY" light 23 and the keep warm element 71. The thermostat power cutoff to resistive element 54 operates in the same manner as the above described circuit. Upon completion of a counting cycle of the timing module, of for example a period of four hours, an output of the timer module cuts off all power to resistive element 54, "POWER ON" indicator light 22, "BREW READY" light 23, thermostat 65 and keep warm element 71.

Figure 6:
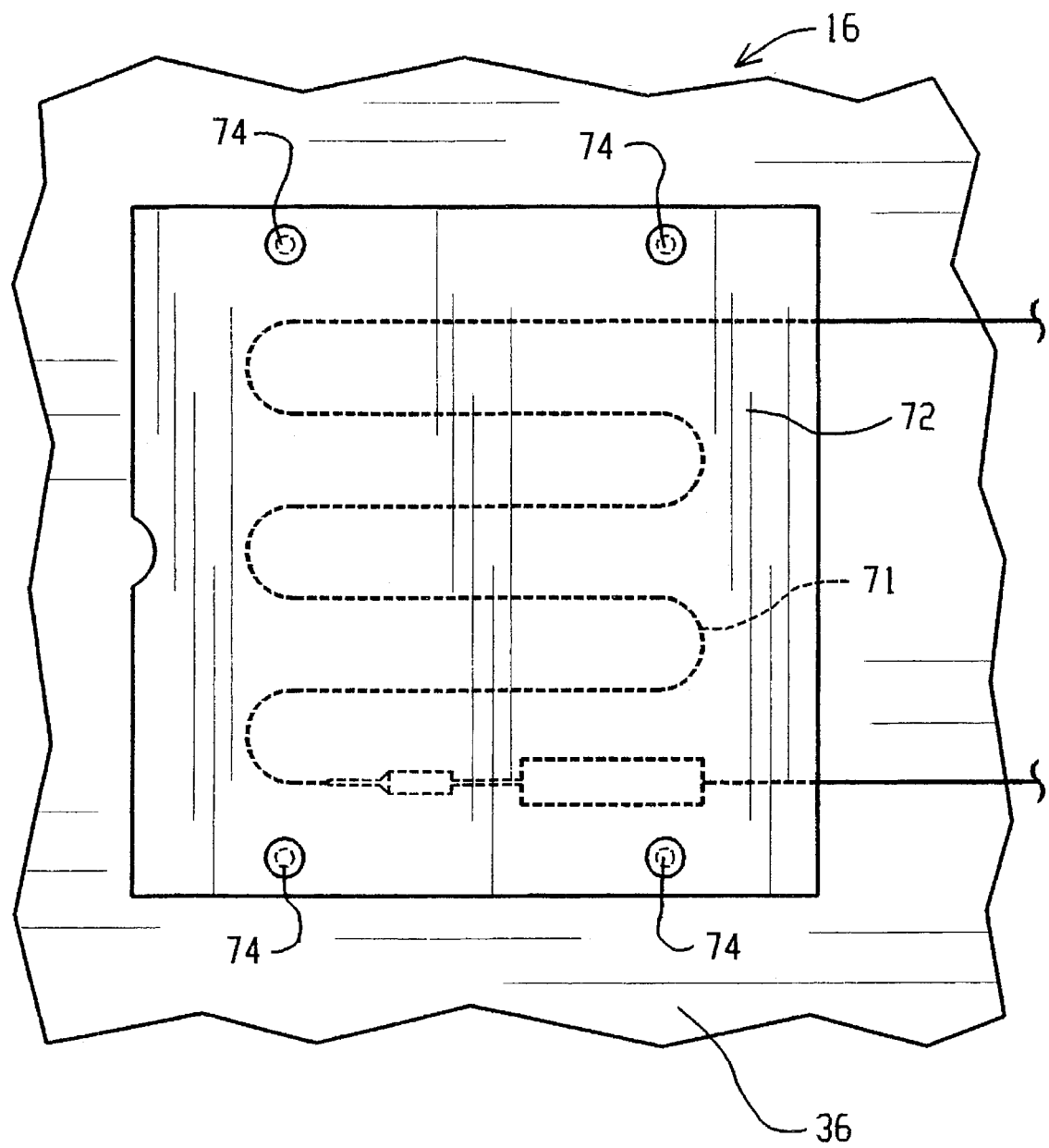
FIG. 6 is a bottom view of a brewed beverage reservoir portion of the brewing apparatus of the present invention.

Referring now to FIG. 6, in order to maintain a warm serving temperature of beverage in the brewed beverage reservoir 16, a keep warm element 71, such as manufactured by HOTWATT, is secured to an exterior surface of bottom wall 36 of liner 28. As shown in FIG. 6, respresenting a bottom view of a portion liner 28, an electrically insulated resistive warming element 71 is arranged in a wide-area serpentine manner upon a mounting plate 72 and secured thereto by an adhesive cover dimensioned to cover substantially all of the mounting plate and the warming element thereon. Mounting plate 72 is, for example, an aluminum sheet of 0.025 inch thickness which directly conducts heat generated by element 71 to bottom wall 36 of liner 28. Cover 73 is preferably heat reflective, such as aluminum foil, in order to reflect heat generated by element 71 onto mounting plate 72. Mounting plate 72 is secured by fasteners 74 directly to bottom wall 36. At least the bottom wall 36 of liner 28 is constructed of a heat tolerant moldable material such as, for example, polycarbonate. Power is supplied to warming element 71 by connection to the circuit described above. In an alternate embodiment, a printed ceramic substrate or thin-film heater may be used as the warming element 71.

Figure 7A:
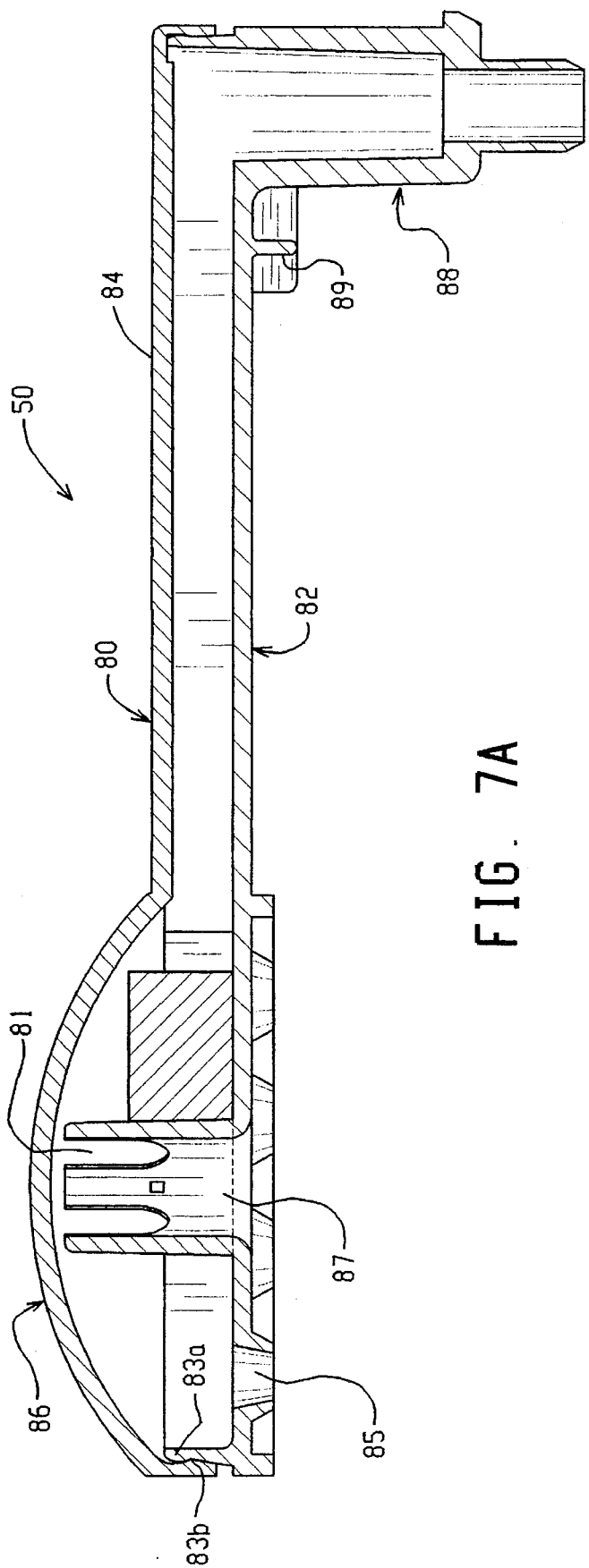
FIGS. 7A–7B illustrate the liquid distributor of the brewing apparatus of the present invention.
Figure 7B:
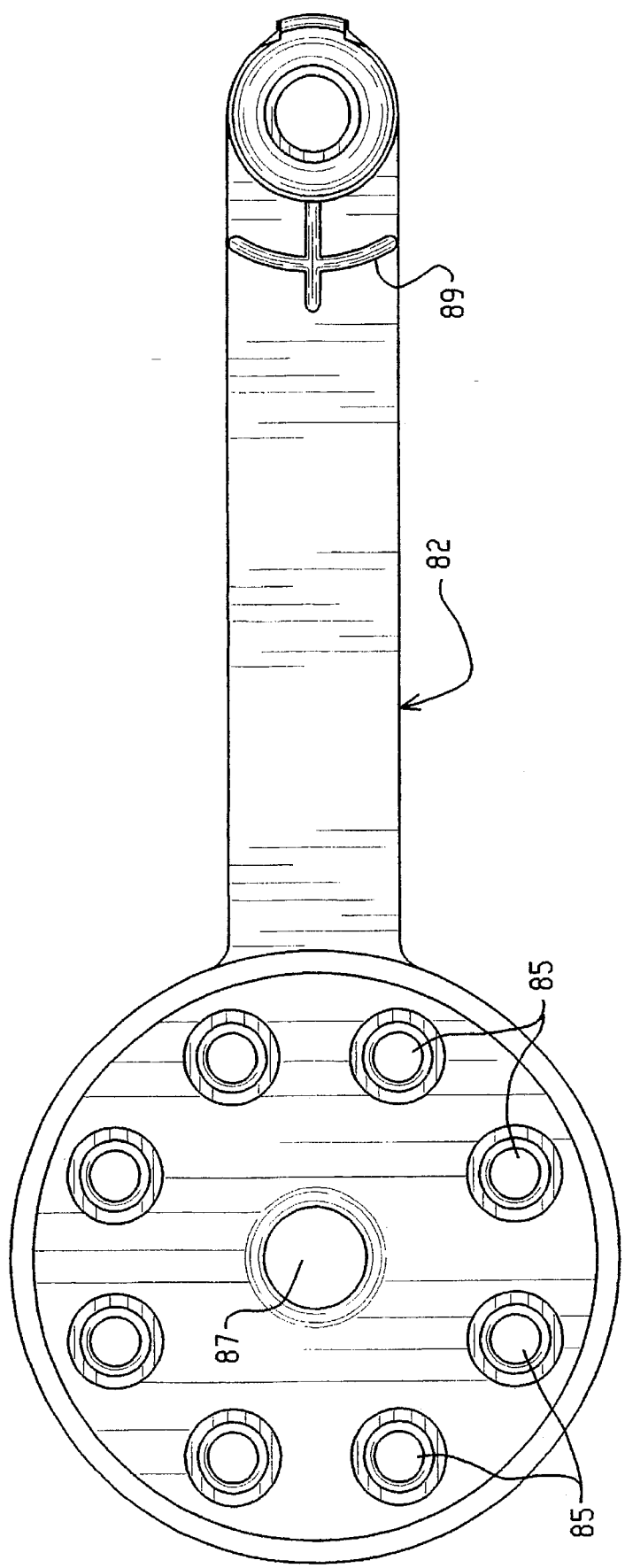

The liquid distributor 50, shown in cross-sectional profile in FIG. 7A, is composed of a top half 80 and a bottom half 82, which are frictionally engagable by insertion of lip 83a on an upper edge of bottom half 82 into a corresponding groove 83b inside of the peripheral edge of top half 80, to form an arm 84 and shower head 86. This construction allows ready access to the interior of the liquid distributor for cleaning. As further shown in the bottom view represented by FIG. 7B, bottom half 82 includes liquid drain ports 85 annularly arranged about a fluted diffusion column 87 to evenly distribute heated liquid, through flutes 81 and ports 85, over a wide area of opening 38 in brewing basket 18. A distal end of arm 84.supports a fitting 88 to which heated liquid supply tube 48 is frictionally connected. As shown in FIG. 3, an upper edge of brewed beverage reservoir 16 includes a support bracket 77 through which fitting 88 is inserted. A support strut 89 provided on a bottom surface of bottom half 82 adjacent fitting 88 contacts an upper surface of bracket 77 to support the liquid distributor horizontally over the opening 38 of brewing basket 18. The flexibility of tube 48 allows the liquid distributor to be pivotally swung about a vertical axis of fitting 88, to a position entirely clear of brewing basket 18, thereby allowing the brewing basket to be lifted vertically out of the beverage reservoir. Ports 85 may be formed in any suitable arrangement in shower head 86 such as, for example, in the sides of the shower head to increase the area of water diffusion.

Figure 8A:
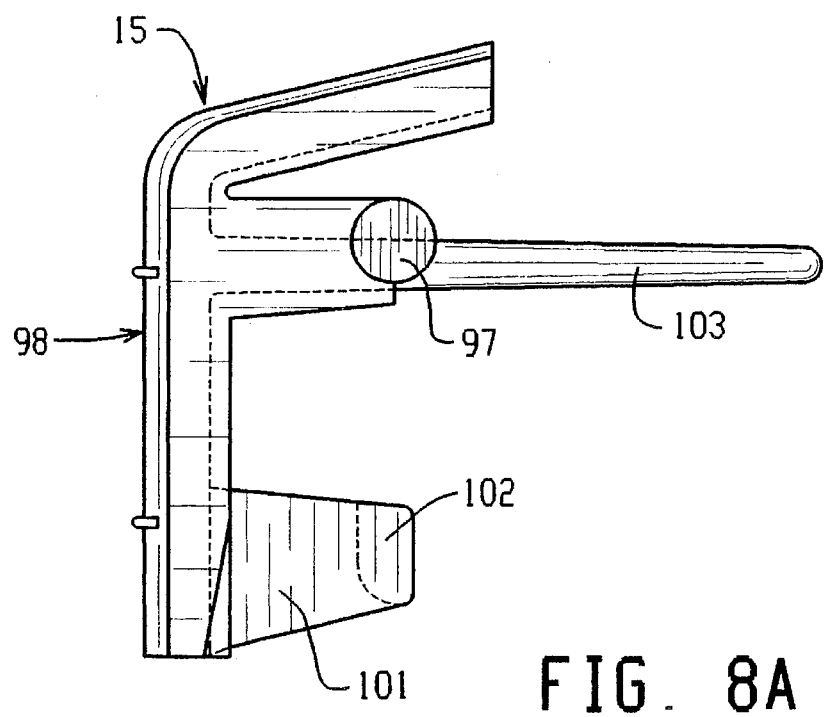
FIGS. 8A and 8B illustrate the latching mechanism of the brewing apparatus of the present invention.
Figure 8B:
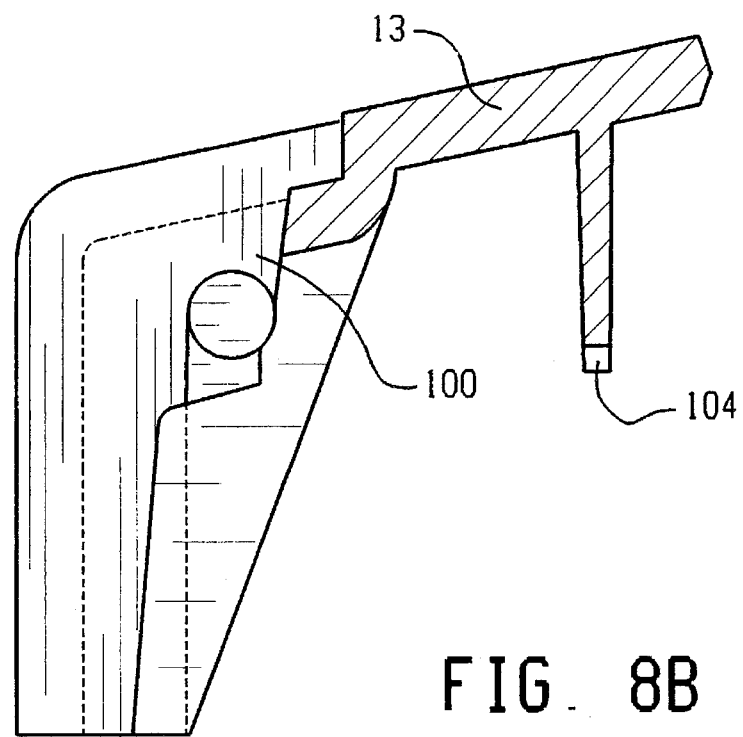

Referring again to FIG. 3, the cover 13 is dimensioned to cover the entire top openings of both the brewed beverage reservoir (and brewing basket) and the liquid reservoir, includes hinge pins 91 adapted for removable supporting engagement with matching hinge pin seats,92 integrally formed upon a top edge of perimeter wall 24 of housing 12. As shown in FIG. 3, the portion of cover 13 which extends over brewing basket 18 is concave to provide adequate clearance for shower head 86. An internal cover wall 93 matching the curvature of interior wall 25 of housing 12, projects vertically downward from an interior surface of cover 13 into abutting contact with the top of interior wall 25 to provide a steam vapor barrier between the brewed beverage reservoir and the liquid reservoir, and to prevent dripping down the exterior of housing 12o As illustrated in FIGS. 1 and 3 and in isolated detail in FIGS. 8A and 8B, a latch 15, mounted in a front center area of cover 13, includes a frontal portion 98 contoured to be flush with the exterior surfaces of cover 13, horizontally disposed mounting pins 97 adapted to be received in a bracket 100 formed in the interior of cover 13, a generally horizontal latch bar 102 supported by arms 101 and positioned for releasable engagement with a latch lip 95 which protrudes upwardly from liner 28, and a flexible biasing arm 103 which extends generally perpendicularly from the vertical face of latch frontal portion 98. Biasing arm 103 contacts at a distal end a strut 102 which extends downward from cover 13 to bias the latch bar 102 in the engaged position with latch lip 95 and, consequently, to position the exterior surfaces of the latch flush with the exterior surfaces of cover 13. As pressure is exerted (by a finger for example) upon latch frontal portion 98 in the general direction indicated, the latch bar 102 is urged out of engagement with latch lip 95 and the cover can be freely opened.

To produce a brewed beverage by operation of the brewing apparatus, a quantity of water is loaded into the liquid reservoir 14. A desired amount of brewing material such as coffee or tea is placed in a filter within the brewing basket in the brewed beverage reservoir. The cover is closed and latched. Switch 20 is put in the "ON" position and the described heating and warming element circuits operate to perform heating of the liquid and warming of the brewed beverage. When all of the liquid is drained from the liquid reservoir, the total quantity of brewed beverage is available for dispensing through faucet 17.

Although the invention has been described in detail with respect to certain preferred embodiments, it is understood that all modifications and variations of the basic principles embodied are within the scope of the invention. For example, although the form and design of the brewing apparatus is suitable for dimensioning as a large capacity brewing apparatus such as an urn, the invention can be readily executed in all sizes. Also for example, the use of different-heating elements and control circuitry to effect heating of the liquid and warming of the brewed beverage, in the context of the basic arrangement of the liquid reservoir and the brewed beverage reservoir, is within the scope and equivalent scope of the invention.

What is claimed is:

1. A brewing apparatus for brewing a quantity of brewed beverage comprising:

a liquid reservoir adapted to receive and hold a liquid for preparing a brewed beverage, a brewed beverage reservoir adjacent the liquid reservoir, a brewing basket adapted to hold a filter and flavor-carrying material and positionable at least partially within the brewed beverage reservoir, a controlled heat source in thermal communication with liquid supplied by the liquid reservoir for providing heated liquid, a heated liquid passageway from the heat source to the brewing basket, and a brewed beverage passageway in the form of a valved conduit in a lower area of a wall of the brewed beverage reservoir through which brewed beverage can exit the brewed beverage reservoir.

2. The brewing apparatus of claim 1 futher comprising a housing which forms the liquid reservoir and the beverage reservoir.

3. The brewing apparatus of claim 2 wherein the brewed beverage reservoir further comprises a liner adapted to fit within a wall of the housing which defines the brewed beverage reservoir and the valved conduit in the lower area of the wall of the brewed beverage reservoir extends through the liner.

4. The brewing apparatus of claim 1 further comprising a heating element in thermal contact with the brewed beverage reservoir.

5. The brewing apparatus of claim 1 wherein the heated liquid passageway comprises a conduit in thermal communication with the heat source and connected at one end to the liquid reservoir and connected at an opposite end to a liquid distributing shower head positionable over an opening to the brewing basket.

6. An apparatus for preparing a quantity of brewed beverage by a heated liquid drip process, the apparatus comprising:

a liquid reservoir for holding a brewing liquid, said liquid reservoir comprising a vessel having an open top, a brewed beverage reservoir for holding a brewed beverage, a brewing basket positionable over an opening to the brewed beverage reservoir, a controlled heat source in thermal communication with liquid supplied from the liquid reservoir, a heated liquid passageway from the liquid reservoir to an opening of the brewing basket through which heated liquid can flow in a single direction from the liquid reservoir to drip into the brewing basket, and a valve-controlled brewed beverage passageway from the brewed beverage reservoir to an exterior of the apparatus through which brewed beverage can exit the brewed beverage reservoir.

7. The apparatus of claim 6 wherein the heated liquid passageway comprises a conduit connected at one end to the liquid reservoir and at another end to a liquid distributor positionable over an opening to the brewing basket, a portion of the conduit in thermal communication with a heat source of sufficient energy to increase a temperature of liquid in the conduit and induce flow of liquid in the conduit from the liquid reservoir to the liquid distributor.

8. The apparatus of claim 7 further comprising a one way valve at the connection of the conduit to the liquid reservoir, said valve preventing liquid from entering the liquid reservoir through the conduit.

9. The apparatus of claim 6 further comprising a cover positionable to cover the open top of the liquid reservoir.

10. The apparatus of claim 9 wherein the brewed beverage reservoir has an open top, and wherein the cover positionable to cover the open top of the liquid reservoir is also positionable to cover the open top of the brewed beverage reservoir.

11. An automatic drip brewing apparatus for preparing and holding a brewed beverage, the apparatus comprising, a water reservoir, a brewed beverage reservoir, a liquid passageway between the water reservoir and the brewed beverage reservoir, a heat source for heating water from the water reservoir, a brew basket for supporting a brewing material, and a cover having no openings and which completely covers the brewed beverage reservoir.

12. An automatic drip brewing apparatus for preparing, holding and dispensing brewed beverage, the apparatus comprising, a brewed beverage reservoir for receiving and holding a brewed beverage, a liquid reservoir partially surrounding the brewed beverage reservoir and adapted to receive and hold liquid used to prepare the brewed beverage, a controlled heat source in thermal communication with the liquid from said liquid reservoir, a basket adapted to hold a filter and a flavor-carrying material in the filter, said basket positionable to receive heated liquid from said liquid reservoir and having an opening through which liquid can pass into said brewed beverage reservoir, and a brewed beverage passageway through a wall of said beverage reservoir through which brewed beverage can exit from said brewed beverage reservoir, and a liner insertable in the brewed beverage reservoir.

13. The apparatus of claim 12 wherein exterior surfaces of walls of the liner are spaced from interior surfaces of walls of the housing which defines the beverage reservoir, whereby an insulative air gap is formed between the liner and the portion of the housing which defines the brewed beverage reservoir.

14. The apparatus of claim 12 further comprising a heating element in thermal communication with a portion of the brewed beverage reservoir liner.

15. The apparatus of claim 12 wherein the brewed beverage reservoir liner further comprises an orifice near the bottom of the liner connectable to the liquid passageway through a wall of the beverage reservoir.

16. An automatic drip brewing apparatus for preparing, holding and dispensing brewed beverage, the apparatus comprising, a brewed beverage reservoir for receiving and holding a brewed beverage, a liquid reservoir partially surrounding the brewed beverage reservoir and adapted to receive and hold liquid used to prepare the brewed beverage, a controlled heat source in thermal communication with the liquid from said liquid reservoir, a basket adapted to hold a filter and a flavor-carrying material in the filter, said basket positionable to receive heated liquid from said liquid reservoir and having an opening through which liquid can pass into said brewed beverage reservoir, and a brewed beverage passageway through a wall of said beverage reservoir through which brewed beverage can exit from said brewed beverage reservoir;

a heated liquid distributor positionable over an opening of the basket, wherein the heated liquid distributor comprises an arm having one end connected to a heated liquid conduit at an edge of the basket and an opposite end comprising a shower head positionable over an approximate center of the first opening of the basket, the shower head having a plurality of openings which direct liquid into the opening of the basket.

17. The apparatus of claim 16 wherein the arm of the liquid distributor is rotatable about the point of connection to the conduit.

18. The apparatus of claim 16 wherein the arm further comprises an indexing tab which indexes the showerhead at a position over an approximate center of an opening of the basket.

19. The apparatus of claim 16 wherein the liquid distributor is comprised of two pieces.

20. An automatic drip brewing apparatus for preparing, holding and dispensing brewed beverage, the apparatus comprising, a brewed beverage reservoir for receiving and holding a brewed beverage, a liquid reservoir partially surrounding the brewed beverage reservoir and adapted to receive and hold liquid used to prepare the brewed beverage, a controlled heat source in thermal communication with the liquid from said liquid reservoir, a basket adapted to hold a filter and a flavor-carrying material in the filter, said basket positionable to receive heated liquid from said liquid reservoir and having an opening through which liquid can pass into said brewed beverage reservoir, and a brewed beverage passageway through a wall of said beverage reservoir through which brewed beverage can exit from said brewed beverage reservoir, and a transparent vessel mounted on an exterior surface of the apparatus and having an opening connected to a passage to the brewed beverage reservoir whereby beverage from the brewed beverage reservoir can enter the transparent vessel.

21. A brewing apparatus for brewing a quantity of brewed beverage comprising:

a liquid reservoir adapted to receive and hold a liquid for preparing a brewed beverage, a brewed beverage reservoir adjacent the liquid reservoir, a brewing basket adapted to hold a filter and flavor-carrying material and positionable at least partially within the brewed beverage reservoir, a controlled heat source in thermal communication with liquid supplied by the liquid reservoir for providing heated liquid, a heated liquid passageway from the heat source to the brewing basket, and a brewed beverage passageway in a wall of the brewed beverage reservoir through which brewed beverage can exit the brewed beverage reservoir;

a housing which forms the liquid reservoir and the beverage reservoir, wherein the brewed beverage reservoir further comprises a liner adapted to fit within a wall of the housing which defines the brewed beverage reservoir.

22. The brewing apparatus of claim 21 wherein exterior of the liner is spaced from an interior of the wall of the housing which defines the brewed beverage reservoir.

* * * * *

UNITED STATES PATENT AND TRADEMARK OFFICE
CERTIFICATE OF CORRECTION

PATENT NO. : 5,560,284
DATED : October 1, 1996
INVENTOR(S) : Weidman, et al

It is certified that error appears in the above-identified patent and that said Letters Patent is hereby corrected as shown below:

On the title page, item [73] Assignee: should read

Health o Meter, Inc.
        Bedford, Ohio

Signed and Sealed this

Seventeenth Day of August, 1999

Attest:

Q. TODD DICKINSON

*Attesting Officer*     *Acting Commissioner of Patents and Trademarks*